US010407838B1

(12) United States Patent
Sylvester (10) Patent No.: US 10,407,838 B1
(45) Date of Patent: Sep. 10, 2019

(54) MODULAR PAVEMENT SLAB

(71) Applicant: Integrated Roadways, LLC, Kansas City, MO (US)

(72) Inventor: Tim Sylvester, Raytown, MO (US)

(73) Assignee: Integrated Roadways, LLC, Kansas City, MO (US)

( * ) Notice: Subject to any disclaimer, the term of this patent is extended or adjusted under 35 U.S.C. 154(b) by 0 days.

(21) Appl. No.: 15/889,718

(22) Filed: Feb. 6, 2018

Related U.S. Application Data

(60) Provisional application No. 62/594,822, filed on Dec. 5, 2017, provisional application No. 62/455,287, filed on Feb. 6, 2017.

(51) Int. Cl.
| | |
|---|---|
| *G01L 1/00* | (2006.01) |
| *E01C 11/00* | (2006.01) |
| *G01M 5/00* | (2006.01) |
| *G01L 1/24* | (2006.01) |
| *G01L 17/00* | (2006.01) |
| *G01G 3/12* | (2006.01) |
| *G01P 3/36* | (2006.01) |

(Continued)

(52) U.S. Cl.
CPC .............. *E01C 11/00* (2013.01); *E01C 5/005* (2013.01); *G01G 3/125* (2013.01); *G01G 19/022* (2013.01); *G01L 1/246* (2013.01); *G01L 17/00* (2013.01); *G01M 5/0041* (2013.01); *G01P 3/36* (2013.01); *E01C 2201/00* (2013.01)

(58) Field of Classification Search
CPC ...... E01C 11/00; E01C 5/005; E01C 2201/00; G01G 3/125; G01G 19/022; G01L 1/246; G01L 17/00; G01M 5/0041; G01P 3/36

USPC ......................................... 73/786
See application file for complete search history.

(56) References Cited

U.S. PATENT DOCUMENTS

| | | |
|---|---|---|
| 2,448,134 A | 8/1948 | Abel |
| 3,222,637 A | 12/1965 | Gray |

(Continued)

FOREIGN PATENT DOCUMENTS

EP 1878854 A2 1/2008

OTHER PUBLICATIONS

Applications of Fiber Optics Sensors in Weigh-in-Motion (WIM) Systems for Monitoring Truck Weights on Pavements and Structures dated Apr. 2003, New Mexico State University, 158 pages.

(Continued)

*Primary Examiner* — Max H Noori
(74) *Attorney, Agent, or Firm* — Hovey Williams LLP (57) ABSTRACT

A modular pavement slab comprises a body, a strain sensor array, and a sensor processor. The body includes a top surface, a bottom surface, and four side surfaces. The modular pavement slab is configured to be coupled to at least one other modular pavement slab via connectors along at least one of the side surfaces. The strain sensor array is retained within the body and is configured to detect a plurality of strains on the body resulting from vehicular traffic across the top surface of the body. The sensor processor is in communication with the strain sensor array. The sensor processor is configured to communicate input signals to the strain sensor array, receive output signals from the strain sensor array, and determine a plurality of time-varying strain values, each strain value indicating a strain experienced over time by a successive one of a plurality of regions of the body.

8 Claims, 3 Drawing Sheets

(51) Int. Cl.
*E01C 5/00* (2006.01)
*G01G 19/02* (2006.01)

(56) References Cited

U.S. PATENT DOCUMENTS

| | | | |
|---|---|---|---|
| 3,534,668 A | | 10/1970 | Scheincha |
| 4,013,851 A | | 3/1977 | Abbondante |
| 4,098,365 A | * | 7/1978 | Pietzsch ............... G01G 3/1402 |
| | | | 177/134 |
| 4,123,158 A | * | 10/1978 | Reytblatt ............... G01B 11/18 |
| | | | 356/32 |
| 4,377,800 A | * | 3/1983 | Fuld ........................ G01B 7/16 |
| | | | 338/2 |
| 4,799,381 A | | 1/1989 | Tromp |
| 5,239,268 A | | 8/1993 | Moriguchi |
| 5,487,307 A | * | 1/1996 | Landgren ................. G01B 7/16 |
| | | | 73/149 |
| 5,586,834 A | | 12/1996 | Tsuji |
| 5,626,289 A | | 5/1997 | Demers, Jr. |
| 5,797,231 A | | 8/1998 | Kramer |
| 6,075,466 A | | 6/2000 | Cohen |
| 6,137,424 A | | 10/2000 | Cohen |
| 6,301,544 B1 | | 10/2001 | Sonderegger |
| 6,389,774 B1 | | 5/2002 | Carpenter |
| 6,607,329 B2 | | 8/2003 | Smith |
| 6,692,184 B1 | | 2/2004 | Kelly et al. |
| 6,709,192 B2 | | 3/2004 | Smith |
| 6,758,023 B1 | | 7/2004 | Sorkin |
| 6,827,521 B2 | | 12/2004 | Sproules |
| 7,134,805 B2 | | 11/2006 | Yee |
| 7,441,984 B2 | | 10/2008 | Kramer |
| 7,520,176 B1 | | 4/2009 | Ko |
| 7,632,037 B2 | | 12/2009 | Brinkman |
| 7,715,994 B1 | | 5/2010 | Richards et al. |
| 8,118,519 B2 | | 2/2012 | Happel |
| 8,511,935 B1 | | 8/2013 | Thomas |
| 8,547,250 B1 | | 10/2013 | Al-Mutawa |
| 8,700,358 B1 | | 4/2014 | Parker, Jr. |
| 8,756,898 B1 | | 6/2014 | Backhaus et al. |
| 8,909,040 B1 | | 12/2014 | Parker, Jr. |
| 8,911,173 B2 | | 12/2014 | Ulislam |
| 8,919,058 B2 | | 12/2014 | Liberman |
| 8,990,032 B2 | | 3/2015 | Bajwa et al. |
| 9,176,224 B2 | | 11/2015 | Kavaler |
| 2003/0231929 A1 | | 12/2003 | Lee |
| 2005/0144866 A1 | | 7/2005 | Chappell et al. |
| 2006/0177269 A1 | | 8/2006 | Kramer |
| 2007/0152846 A1 | | 7/2007 | Tonelli et al. |
| 2009/0116906 A1 | | 5/2009 | Kaylor et al. |
| 2009/0273472 A1 | * | 11/2009 | Brooks ................. G08B 13/10 |
| | | | 340/541 |
| 2010/0018359 A1 | | 1/2010 | Proper |
| 2010/0126782 A1 | * | 5/2010 | Bergan ................ G01G 19/022 |
| | | | 177/211 |
| 2011/0221624 A1 | | 9/2011 | Kavaler |
| 2011/0262263 A1 | | 10/2011 | Comerford |
| 2011/0277547 A1 | | 11/2011 | Duncan |
| 2013/0115000 A1 | | 5/2013 | Smith |
| 2013/0183091 A1 | | 7/2013 | Buitrago |
| 2013/0209171 A1 | | 8/2013 | Thomas |
| 2014/0260570 A1 | | 9/2014 | Ranwell |
| 2014/0270947 A1 | | 9/2014 | Ulislam |
| 2015/0078822 A1 | | 3/2015 | Backhaus et al. |

OTHER PUBLICATIONS

State of The Practice and Art for Structural Health Monitoring of Bridge Substructures (Chapter 2 re FOS in bridges) dated May 2014, U.S. Department of Transportation Federal Highway Administration, 20 pages.

Fiber-Optics Research Program: Critical Knowledge for Infrastructure Improvement dated Jul./Aug. 1999, U.S. Department of Transportation Federal Highway Administration, 8 pages.

Distributed Strain and Temperature Measurement, Sensuron, 6 pages.

Fiber Optic Sensing System (FOSS) monitors multiple critical parameters in real time dated Jun. 12, 2015, NASA, 9 pages.

Office Action received in connection with U.S. Appl. No. 14/383,080 dated Aug. 25, 2015, 9 pages.

Final Office Action received in connection with U.S. Appl. No. 14/383,080 dated Feb. 23, 2016, 11 pages.

International Search Report and Written Opinion received in connection with PCT Application No. PCT/US2013/029992 dated Jun. 4, 2013, 11 pages.

Office Action received in connection with U.S. Appl. No. 15/084,778 dated May 6, 2016, 13 pages.

Office Action received in connection with U.S. Appl. No. 15/156,001 dated Jul. 20, 2017, 14 pages.

\* cited by examiner

MODULAR PAVEMENT SLAB

RELATED APPLICATION

The current patent application is a non-provisional application which claims priority benefit, with regard to all common subject matter, to the following identically-titled U.S. Provisional Applications: Application No. 62/455,287, filed Feb. 6, 2017; and Application No. 62/594,822, filed Dec. 5, 2017. Each of the earlier-filed provisional applications is hereby incorporated by reference in its entirety into the current application.

BACKGROUND OF THE INVENTION

Field of the Invention

This invention relates generally to the field of pavement systems and, in particular, to a pre-fabricated, modular pavement slab equipped for embedded self-monitoring of form and integrity.

Description of the Related Art

Pre-fabricated, modular pavement slabs have traditionally offered an attractive alternative to continuous pour systems at least because they can be individually removed, repaired and/or replaced with relative ease. Traditional continuous pour systems require significantly more time and/or money for removal and replacement.

However, pre-fabricated, modular pavement slab systems have untapped potential for enabling focused, quick and low-cost maintenance and/or repair. For instance, defect detection for the slab and/or sub-grade is still overwhelmingly performed using the same traditional tools used in continuous pour systems. A serviceable modular pavement slab is needed to improve the longevity and usefulness of such alternatives to continuous pour systems.

SUMMARY OF THE INVENTION

Embodiments of the current invention solve the above-mentioned problems and provide a distinct advance in the arts of modular pavement slabs that provide pavement condition indexing and vehicle position sensing.

An embodiment of the modular pavement slab comprises a body, a strain sensor array, and a sensor processor. The body includes a top surface. The strain sensor array is retained within the body and is configured to detect a plurality of strains on the body resulting from vehicular traffic across the top surface of the body. The sensor processor is in communication with the strain sensor array. The sensor processor is configured to communicate input signals to the strain sensor array, receive output signals from the strain sensor array, and determine a plurality of time-varying strain values, each strain value indicating a strain experienced over time by a successive one of a plurality of regions of the body.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Prior art pre-cast slabs have long been recognized as an alternative to continuous pour solutions, which have been more popular traditionally within the United States. Part of the appeal offered by pre-cast paving systems is serviceability—when a portion of pavement requires service, it may be removed and replaced with relative ease as compared with similar repair efforts using continuous pour solutions aimed at restoring the pavement to like-new condition. Nonetheless, defects within the body of a pavement slab and/or in the underlying sub-grade may exist for years prior to detection, which may lead to additional damage and more expensive repair efforts.

Embodiments of the present inventive concept improve existing detection methods and apparatus by providing a permanent, embedded form-monitoring system comprising a plurality of strain gauges distributed in an array across at least a portion of the length and width of each pre-cast slab. The array may be substantially continuous in nature—for example, where the array includes one or more fiber optic cables extending in a pattern throughout the slab—and may collect data at a plurality of strain detection points regarding the transfer of force through a sensing volume. The data collected from the strain detection points may be analyzed locally within each slab, using an adjacent system proximate to the slab, and/or transmitted to a remote database for analysis against data from neighboring slabs to detect developing defects in the sensing volume and/or underlying sub-grade. The data may also or alternatively be put to additional uses, including vehicle monitoring providing positional data, vehicle weights, speeds, axle widths, axle lengths, traffic patterns, vehicle behaviors, and other information that can be detected through monitoring the internal and external deformations of the pavement slab.

Collection of data regarding changes over time in how a segment and its surrounding segments within the sensing volume transfer forces therethrough may permit modeling of sufficient resolution to detect defects in the paving apparatus and/or in the underlying sub-grade. Moreover, accelerations, gyroscopic motion, magnetic fields, temperature, salinity, water content and additional properties may be detected within each slab to enhance data resolution and permit easier identification of changes in slab form and/or integrity and/or to monitor atmospheric or environmental conditions.

Figure 1:
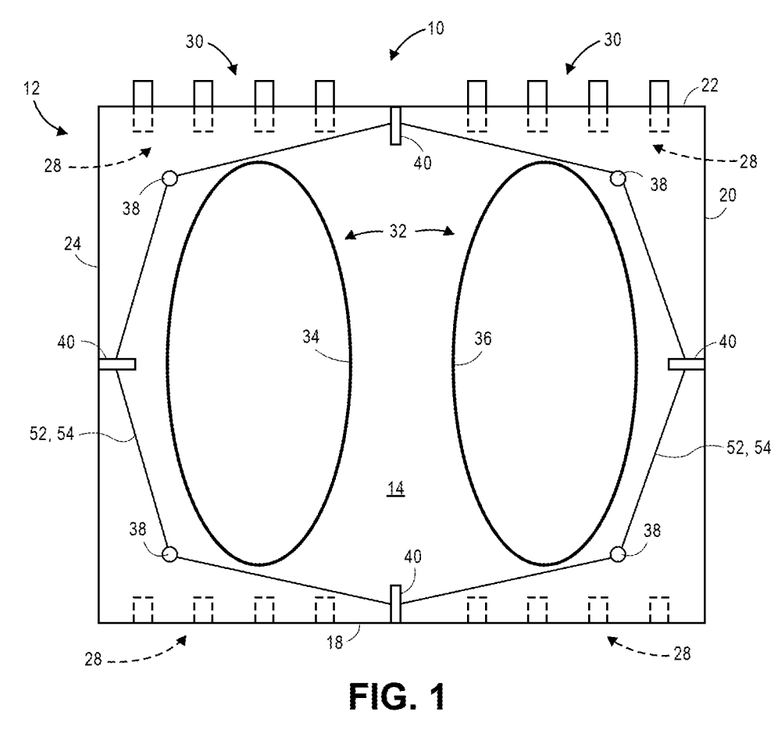
FIG. 1 is a top schematic view of a self-monitoring modular pavement slab according to the present inventive concept.
Figure 2:
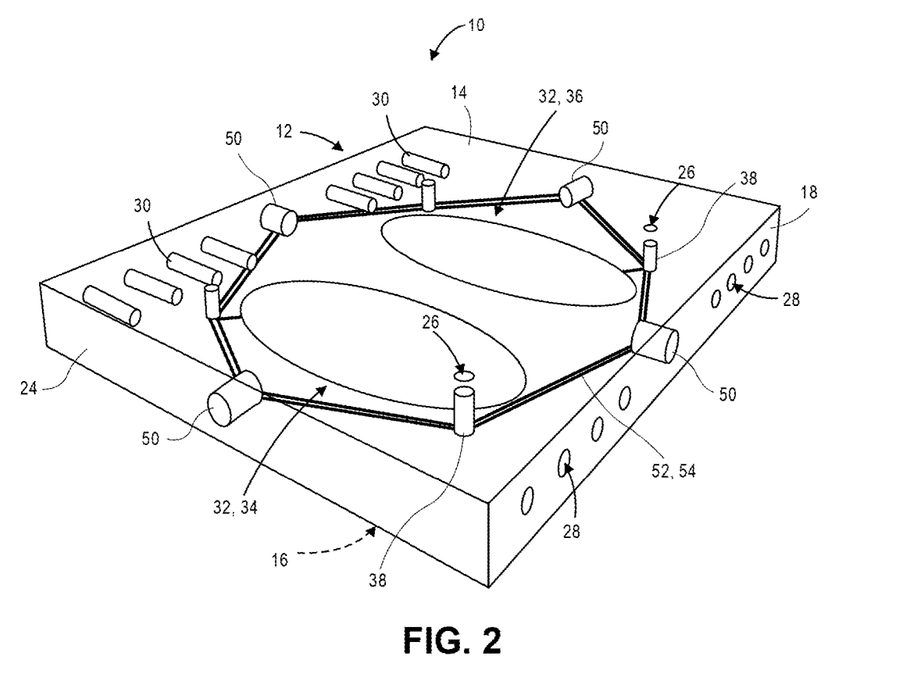
FIG. 2 is an elevated schematic view of the self-monitoring modular pavement slab of FIG. 1 illustrating a sensing body.

Turning to FIGS. 1-2, a pre-cast, self-monitoring modular pavement slab 10 according to an embodiment of the present inventive concept broadly comprises a body 12 generally having a rectangular box shape with an upper surface 14, a bottom surface 16, and four side surfaces 18, 20, 22, 24. The body 12 may be composed primarily of precast concrete pavement. The body 12 may also or alternatively comprise asphalt, plastic material, fiberglass, carbon fiber, geopolymers and/or other materials that may serve as and/or support driving surfaces without departing from the spirit of the present inventive concept.

The modular pavement slab 10 may include a plurality of access ports 26 defined in and below the upper surface 14 (it should be noted that the third and fourth access ports are not illustrated in FIG. 2 to avoid obscuring other components). The access ports 26 may house embedded lifting receivers (not shown) and are spaced for balanced lifting of the body 12. Access ports may also permit fluid communication between upper and bottom surfaces and may be configured to house and/or provide access to other sensing equipment (see incorporations by reference below) without departing from the spirit of the present invention.

Two opposing side surfaces 18, 22 define dowel cavities 28 therein that extend within and toward the center of the body 12. Dowel rods 30 may extend at least partway out of the cavities 28—for example where the modular pavement slab 10 is assembled to neighboring structures such as other paving apparatus—and each may be secured in place within the slab and/or a neighboring structure, following assembly, using grouting or the like.

It is foreseen that additional of the substantially vertical side surfaces or faces of a body may include dowel cavities and rods without departing from the spirit of the present inventive concept. It is also foreseen that other load-transferring structure may be used in lieu of or in addition to dowel rods without departing from the spirit of the present inventive concept. A rubber skirt, backer board, spacing rod, tar mixture, grouting or similar buffering substance may also be placed in seams between a modular pavement slab and neighboring structures and/or below the modular pavement slab. A modular pavement slab preferably also includes an internal reinforcement grid (not shown), which may be comprised of at least two layers of steel rebar lattice or other known internal reinforcement structures such as fiberglass reinforcement mat, geotechnical mat, carbon fiber mat, or loose reinforcement material such as fiberglass fibers, carbon fibers, plastic fibers, or metallic shavings. More broadly, it is foreseen that embodiments of the present inventive concept are interoperable with the paving systems and apparatuses described in U.S. Patent Publication No. 2016-0222594 A1 to Sylvester and in U.S. Patent Publication No. 2017-0191227 A1 to Sylvester, each of which is hereby incorporated by reference herein in its entirety.

The modular pavement slab 10 also includes a strain sensor array 32 distributed at least partly across the length and width of body 12. Strain sensor array 32 includes a plurality of optical fiber sensors. In the exemplary embodiments shown in the figures, the strain sensor array 32 includes first and second optical fiber sensors 34, 36. Each optical fiber sensor 34, 36 may include optical fiber sensing technologies including but not limited to one or more methods such as Rayleigh, Brillouin, Raman, or Fiber Bragg Grating (FBG) technologies, distributed along the length thereof. In the described method using FBGs, the FBGs are positioned in the optical fiber with selectable space therebetween. Each FBG, or any other method implemented as described above but not limited to those specifically named, provides a measurement of the strain of its surrounding environment, which is a local volume or region of the body 12. Alternatively, or additionally, each optical fiber sensor 34, 36 may include a plurality of individually packaged FBGs coupled to one another with a plurality of optical fibers, with each optical fiber coupling two FBGs. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG.

The optical fiber sensors 34, 36 are shown in the figures to be implemented with a circular or oval layout within the body 12. However, the optical fiber sensors 34, 36 may be implemented within the body 12 in a serpentine pattern layout, a coil pattern layout, a grid pattern, an array of individual fiber optic lines, or other geometric pattern layouts. In addition, the first optical fiber sensor 34 may have a first layout, while the second optical fiber sensor 36 may have a second layout. The optical fiber sensors 34, 36 are also shown to occupy separate regions of the body 12. In other embodiments, the optical fiber sensors 34, 36 may overlap one another, for example along the depth or height of the body 12, or may otherwise occupy the same region of the body 12 within a given plane. While the drawings demonstrate two fibers, a plurality of fibers may be incorporated into the functional unit incorporating one or more fiber patterns, or fiber optic sensing methods, within the body of a slab.

The positioning of the FBGs or alternative sensing elements of other sensing methods within each optical fiber may be selected in combination with the layout of each optical fiber sensor 34, 36 to establish a desired resolution of the strain measurements throughout the volume of the body 12 (e.g., within the boundaries of the body 12 illustrated in FIG. 2) and/or with respect to the surface area of the upper surface 14 of the body 12. For example, a smaller spacing between FBGs within the optical fiber sensors 34, 36 produces a greater resolution of strain measurements, while a larger spacing leads to lower resolution. In addition, layout patterns of the optical fiber sensors 34, 36 such as a serpentine or coil produces a greater resolution of strain measurements, while patterns such as a circle provide lower resolution.

In an embodiment, a strain sensor array may include at least three optical fiber sensors (not shown) arranged in a linear layout and positioned within a slab along the length thereof. In such embodiments, each optical fiber sensor may extend along a majority of the length of the slab and be positioned in proximity to, and association with, a wheel path of vehicles travelling on a corresponding apparatus. For example, a first and a second optical fiber sensor may be placed closer to outer edges of the slab along the wheel paths of most automobiles and trucks. A third optical fiber sensor may be placed close to the center of the slab along the wheel path of a motorcycle. It is foreseen, however, that in certain embodiments strain sensor arrays may include a plurality of strain sensors distributed across a portion of the length and width of the paving apparatus without departing from the spirit of the present inventive concept. One of ordinary skill will also appreciate that arrays including solid-state strain gauges, vibrating wire strain gauges, load cells, piezoelectric elements and/or similar known sensors are within the scope of the present invention.

While it is foreseen that embodiments of the present inventive concept may be constructed in the field or on site—for example as part of a cast-in-place installation—or be pre-fabricated into an assembly that can be installed into alternative paving materials such as asphalt or cast-in-place concrete, it is preferred that the strain sensor array 32 be encased and permanently fixed within body 12 during an offsite pre-fabrication process. The optical fiber sensors 34, 36 may be laminated and/or fixed to a top side of a bottommost reinforcement layer (not shown, but see, e.g., FIGS. 2-4 of U.S. Patent Publication No. 20170191227A1) of the modular pavement slab 10 during fabrication, essentially extending in a substantially horizontal plane at a given height within the body 12. Placement near the bottom of the body 12 may provide greater resolution from and/or amplification of data collected by the strain sensor array 32. Moreover, fixing the strain sensor array 32 to a reinforcement layer may generate a more holistic data set representing changes in form across the entire body 12 because a preferred reinforcement layer will extend across substantially the entire length and width of the body 12 and may be less susceptible to localized distortions resulting from pockets or imperfections in the body 12.

It is foreseen that all or portions of a strain sensor array may be encased at different and/or varying heights within a slab without departing from the spirit of the present inventive concept. For instance, disposing at least one sensor at a different height within the slab—such as vertically above or below a second sensor—may provide additional resolution for detecting defects in the slab. However, long dimensions of optical fiber sensors are preferably in substantial alignment with a direction of travel, for example along a length axis, which may improve detection of vehicular load progression across a top surface of the slab.

Figure 3:
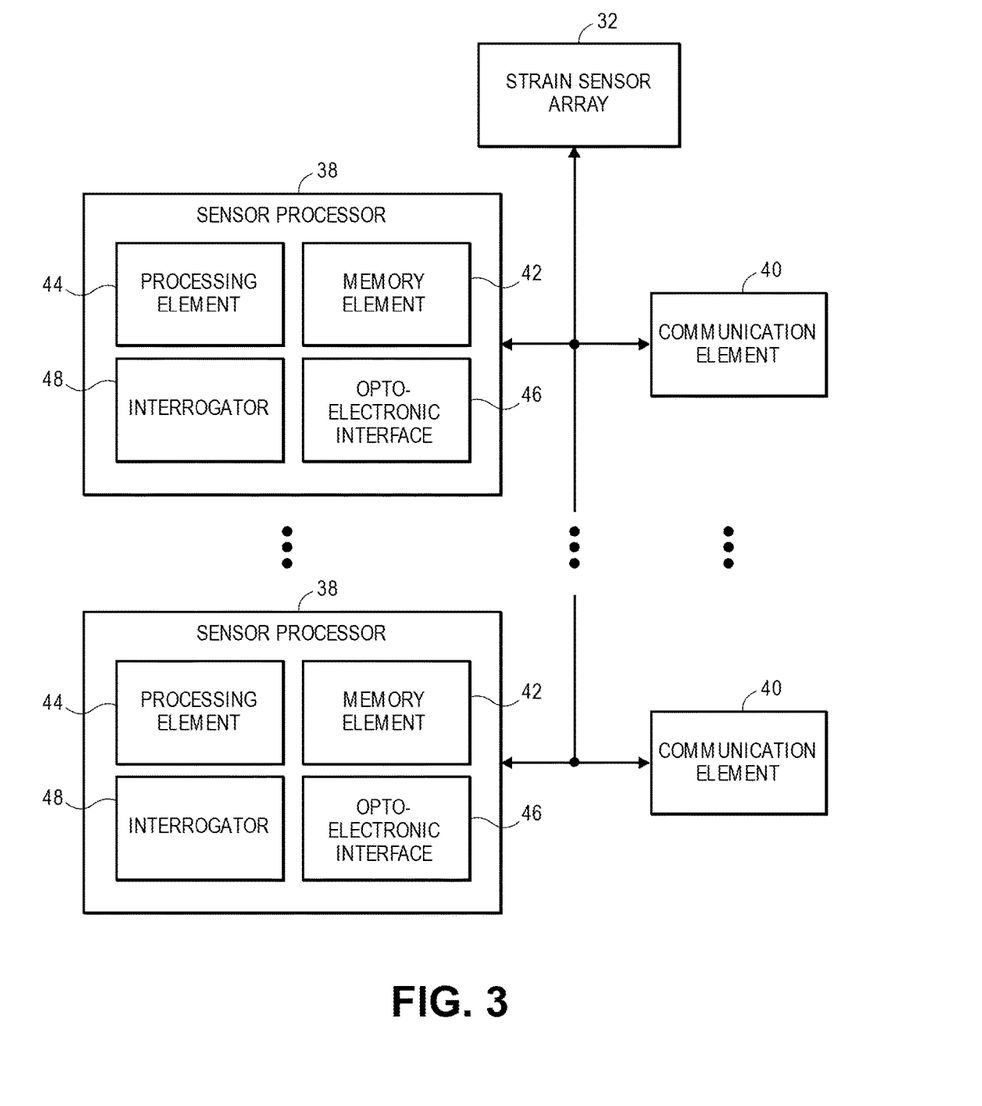
FIG. 3 is a schematic block diagram of various electronic components of the self-monitoring modular pavement slab of FIG. 1.

The modular pavement slab 10 also may include at least one sensor processor 38 and at least one communication element 40 to provide signal control and processing as well as communication, as shown in FIG. 3. The sensor processor 38 includes a memory element 42, a processing element 44, and an optoelectronic interface 46. Each sensor processor 38 may be retained within a housing that is accessible through a successive one of the access ports 26. In addition, each sensor processor 38 may be removable and replaceable, and access for such removal may be protected by a keyed security device—such as an interlock connecting the housing to the body 12 and requiring a special tool to disconnect—and/or grouting or the like.

The memory element 42 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 42 may be embedded in, or packaged in the same package as, the processing element 44. The memory element 42 may include, or may constitute, a "computer-readable medium". The memory element 42 may store the instructions, code, code statements, code segments, software, firmware, programs, applications, apps, services, daemons, or the like that are executed by the processing element 44. The memory element 42 may also store settings, data, databases, and the like.

The processing element 44 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 44 may generally execute, process, or run instructions, code, code segments, code statements, software, firmware, programs, applications, apps, processes, services, daemons, or the like. The processing element 44 may also include hardware components such as finite-state machines, sequential and combinational logic, and other electronic circuits that can perform the functions necessary for the operation of the current invention. The processing element 44 may be in communication with the other electronic components through serial or parallel links that include universal busses, address busses, data busses, control lines, and the like.

The optoelectronic interface 46 generally converts electronic signals to optical signals and vice versa. The optoelectronic interface 46 may include photonic generator(s), such as light-emitting diodes (LEDs), lasers including top emitters, edge emitters, or the like, as well as photodetectors, such as photodiodes, phototransistors, photoresistors, phototubes, or the like. The optoelectronic interface 46 may further include electronic circuitry such as amplifiers, filters, analog-to-digital converters (ADCs), digital-to-analog converters (DACs), and so forth. The optoelectronic interface 46 receives electronic signals and converts them to transmitted optical signals, i.e., electromagnetic radiation having a plurality of wavelengths in the visible and/or infrared regions of the electromagnetic spectrum. The optical signals correspond to the electronic signals in amplitude, frequency, and duration. The optoelectronic interface 46 receives optical signals and converts them to generated electronic signals having a voltage level, current level, power level, or the like corresponding to the optical signals in amplitude, frequency, and duration. The optoelectronic interface 46 may also generate an electronic data stream that corresponds to the received optical signals.

Through hardware, firmware, software, or various combinations thereof, the sensor processor 38 may be configured or programmed to perform at least the following functions. The sensor processor 38 generally controls the operation of the strain sensor array 32 by generating the input signals and communicating them to the strain sensor array 32 and receiving and processing the output signals of the strain sensor array 32. In some embodiments, a single sensor processor 38 may be coupled to and control the operation of both optical fiber sensors 34, 36. In other embodiments, the modular pavement slab 10 may include multiple sensor processors 38, each coupled to and controlling the operation of a respective one of the optical fiber sensors 34, 36. The sensor processor 38 further includes an interrogator 48 as a function of the processing element 44 or as a separate component. In some embodiments, the interrogator 48 may further include, or be in electronic communication with, the optoelectronic interface 46. Utilizing the interrogator 48, the sensor processor 38 generates a plurality of optical signals, each having a unique wavelength, which are transmitted through the optical fiber sensors 34, 36. The optical signals may be transmitted simultaneously or sequentially. The parameters of the optical signals transmitted by the sensor processor 38 may be selectively programmable.

In the illustrated embodiment, all of the optical signals are received by each FBG in the optical fiber sensors 34, 36. But, each FBG may reflect only the optical signal whose wavelength is the same as the one the FBG is designed to reflect. Furthermore, the characteristics of the reflected optical signal, such as intensity change, amplitude change, time delay, and/or shifted wavelength, may vary according to the strain experienced by the FBG, thus providing a measurement of the strain on the body 12 in the local volume surrounding the FBG. The sensor processor 38 receives all of the reflected optical signals and analyzes them to determine the strain at each location of an FBG. In addition, the sensor processor 38 repeats this process dozens or hundreds of times per second.

The sensor processor(s) 38 may create a virtual database or table of measured strain values that is stored in the memory element 42. The virtual database may include a plurality of historically-recorded strain values for each FBG. Since the X and Y coordinate locations (with respect to the upper surface 14 of the body 12) of each FBG are known, the sensor processor 38 may create a time-varying virtual map of strain values experienced by the body 12 resulting from the weight or mass of vehicles travelling across the upper surface 14 thereof—each strain value indicating a strain experienced over time by a successive one of a plurality of regions of the body 12. In addition, utilizing the change in strain along a particular path or in certain areas, such as vehicle wheel paths, the sensor processor 38 can determine a velocity vector, i.e., a speed and direction, of the vehicles traversing the upper surface 14. Furthermore, the sensor processor 38 may utilize a lookup table or machine learning or artificial intelligence techniques to determine a type of vehicle that is traversing the upper surface 14 based on dynamic characteristics, such as a magnitude of change in amplitude, of the measured strain values.

The communication element 40 generally allows communication with external systems or devices. The communication element 40 may include signal and/or data transmitting and receiving circuits, such as antennas, amplifiers, filters, mixers, oscillators, digital signal processors (DSPs), and the like. The communication element 40 may establish communication wirelessly by utilizing radio frequency (RF) signals and/or data that comply with communication standards such as cellular 2G, 3G, 4G, LTE, or 5G, Institute of Electrical and Electronics Engineers (IEEE) 802.11 standard such as WiFi, IEEE 802.16 standard such as WiMAX, Bluetooth™, or combinations thereof. In addition, the communication element 40 may utilize communication standards such as ANT, ANT+, Bluetooth™ low energy (BLE), the industrial, scientific, and medical (ISM) band at 2.4 gigahertz (GHz), commercially available or customized Radio Frequency Identification (RFID), or the like. Alternatively, or in addition, the communication element 40 may establish communication through connectors or couplers that receive metal conductor wires or metal conductor cables which are compatible with networking technologies such as ethernet. In certain embodiments, the communication element 40 may also couple with optical fiber cables.

In some embodiments, the modular pavement slab 10 may include a single communication element 40 that is in electronic communication with the one or more sensor processors 38. In other embodiments, the modular pavement slab 10 may include a plurality of communication elements 40, each communication element 40 in electronic communication with a respective one of the sensor processors 38. In any case, the communication element 40 may receive measured strain values, velocity data, and vehicle data from one or more of the sensor processors 38 and communicate the data to other sensor processors 38 in the same modular pavement slab 10 or other slabs 10 or external devices or systems, such as through Bluetooth™, WiFi, and/or cellular protocols. The communication element 40 may also receive programming data or instructions for the sensor processors 38 to operate the strain sensor array 32 from external devices or systems or other apparatuses 10. The programming and instructions may be communicated to the appropriate sensor processors 38.

In various embodiments, the modular pavement slab 10 further includes a plurality of communication ports 50. Each communication port 50 may include a plurality of electrical and/or optical connectors. Each of the connectors, whether electrical or optical, may couple directly with a corresponding connector on the communication port 50 of another modular pavement slab 10 or with electrical cables or optical fibers that couple to other communication ports 50. Each communication port 50 is positioned on a successive one of the four side surfaces 18, 20, 22, 24 of the body 12, typically close to the center of the side surface, such that, when the apparatuses 10 are placed next to one another to form a road, the communication port 50 of one modular pavement slab 10 aligns with, and may couple to, the communication port 50 of its adjacent modular pavement slab 10. In addition, each communication port 50 is in electronic communication with one or more communication elements 40 to enable communication of measured strain values, velocity data, and vehicle data from one or more of the sensor processors 38.

The modular pavement slab 10 also includes data and/or power lines 52, 54 extending between sensor processors 38 and communication elements 40. It is foreseen that the illustrated pattern of wired connection between electronics of the modular pavement slab 10 may vary, and/or that wireless communication routers may be used, without departing from the spirit of the present inventive concept. It is also foreseen that lines, cables and/or wires described herein for data and/or power transfer may comprise a variety of materials—including cable, fiber and wires of various materials—without departing from the spirit of the present inventive concept.

In operation, as a load is applied to upper surface 14, the applied force may propagate through segments of the sensing volume, creating temporary (and, possibly, permanent) deformations in the material of body 12. As the propagating force deforms areas surrounding the strain sensor array 32, strains are sensed by the optical fiber sensors 34, 36 and determined by one or more sensor processors 38. The time-varying measured strain data may be recorded and stored in one or more memory elements 42 and utilized to determine the presence and/or location of vehicles on the upper surface 14, as well as their orientations, directions, speeds, weights, tire pressures, and other data points which may be derived from such strain distributions.

Loads on the sensing volume of the body 12 may be continuously sensed over long periods of time, with significant localized variances in how forces move through segments of the sensing volume being noted as potentially indicative of defects in and/or damage to body 12 and/or the underlying sub-grade. Such data may be transmitted remotely for further processing against data gathered from surrounding slabs, which may provide further clarity regarding the potential cause(s) of irregularity, for example by providing relative control groups of how nearby slabs are reacting to loads. Sensor data may also or alternatively be analyzed locally and/or remotely in real time for use by navigation (e.g., autonomous) guidance systems, emergency alert and car deviation systems, and for other uses. Data obtained from the strain sensor array 32 may also be used to measure internal and applied loads, deflection, 3D shape, moisture content and/or temperature. The data may be analyzed to indicate vehicle location, orientation, speed, weight, and the like.

For instance, the communication elements 40 may establish direct and/or indirect communication(s) with vehicles for transmitting raw and/or processed data collected via the strain sensor array 32. Such data may be used in connection with autonomous and/or self-driving technologies (e.g., Level 4 autonomous driving). In an embodiment, one or more of the communication elements 40 may continuously or periodically transmit such data—i.e., regarding objects and/or vehicles present on the slab 10 (e.g., position, velocity, weight, etc.)—to one or more autonomous vehicles to support automated navigation. In a more particular embodiment, data obtained via the strain sensor arrays 32 of a system of slabs 10 may comprise and/or be integrated into vehicular location, positioning, navigation, telemetry, or obstacle avoidance systems to provide and/or improve accuracy of positional data in support of autonomous driving operations.

In addition, the communication elements 40 may receive data and/or information from vehicles implementing autonomous and/or self-driving technologies that are in the vicinity of, or traveling upon, the associated slab 10. The data and/or information may include velocity and/or heading information, vehicle identification information, and the like. The data and/or information may be utilized by the slab 10 for verification purposes, fault detection or correction purposes, and the like. Additionally, or alternatively, the data and/or information may be transferred to other slabs 10 in the vicinity or in the direction of travel of the vehicle.

It should also be noted that a benefit of the illustrated embodiment, while not required to practice the present inventive concept, is multiple redundancies. For instance, first and second optical fiber sensors 34, 36 may permit operation, albeit with potentially reduced data resolution, even in the event one fails. Moreover, the multiple sensor processors 38 may redundantly include interrogators 48 and/or electrical communication with the optical fiber sensors 34, 36 such that failure of a single sensor processor 38 does not necessarily lead to loss of any output from the strain sensor array 32. In the same vein, multiple communication elements 40 may also provide several data outputs (and, preferably, inputs) that may increase the longevity of each modular pavement slab 10 by providing alternative access points in the event of a single communication element 40 failure.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A modular pavement slab comprising:
   a body including a top surface, a bottom surface, and four side surfaces, the modular pavement slab configured to be coupled to at least one other modular pavement slab via connectors along at least one of the side surfaces;
   a strain sensor array retained within the body, the strain sensor array configured to detect a plurality of strains on the body resulting from vehicular traffic across the top surface of the body;
   a sensor processor in communication with the strain sensor array and configured to—
     communicate input signals to the strain sensor array,
     receive output signals from the strain sensor array,
     determine a plurality of time-varying strain values, each strain value indicating a strain experienced over time by a successive one of a plurality of regions of the body; and
   a plurality of dowel cavities defined by the body;
   said connectors comprising a plurality of dowel rods extending from a first side surface of the four side surfaces,
   said plurality of dowel cavities extending into the body from a second side surface of the four side surfaces, the second side surface being substantially opposite from the first side surface.

2. The modular pavement slab of claim 1, wherein the strain sensor array includes first and second optical fiber sensors, each optical fiber sensor including an optical fiber with a plurality of fiber Bragg gratings spaced apart axially along the optical fiber.

3. The modular pavement slab of claim 2, wherein each optical fiber sensor forms a loop and the first optical fiber sensor is positioned adjacent to the second optical fiber sensor within the body.

4. The modular pavement slab of claim 1, wherein the processing element is further configured to determine a speed and a direction of each vehicle that travels across the top surface of the body.

5. The modular pavement slab of claim 1, wherein the processing element is further configured to determine a weight of each vehicle that travels across the top surface of the body.

6. The modular pavement slab of claim 1, wherein the processing element is further configured to determine a tire pressure of each tire of each vehicle that travels across the top surface of the body.

7. The modular pavement slab of claim 1, wherein the processing element is further configured to determine a type of each vehicle that travels across the top surface of the body.

8. The modular pavement slab of claim 1, further comprising a communication element in electronic communication with the sensor processor and configured to communicate information derived from the strain values to other modular pavement slabs or external systems.

* * * * *